United States Patent
Urakoshi et al.

[19]

[11] Patent Number: 6,067,564
[45] Date of Patent: May 23, 2000

[54] PAY BROADCASTING RECEIVER APPARATUS

[75] Inventors: Akira Urakoshi, Higashi-Osaka; Akihiko Yamashita, Kobe; Takahiro Kondo, Daito; Masako Otsuki, Osaka, all of Japan

[73] Assignee: Sanyo Electric Co., Ltd., Japan

[21] Appl. No.: 08/742,568

[22] Filed: Oct. 28, 1996

[30] Foreign Application Priority Data

Oct. 31, 1995 [JP] Japan ..................................... 7-283986
Mar. 29, 1996 [JP] Japan ..................................... 8-077369
Sep. 30, 1996 [JP] Japan ..................................... 8-259627

[51] Int. Cl.[7] ............................... H04N 7/10; H04N 7/14
[52] U.S. Cl. ............................ 709/217; 348/10; 348/12; 348/13
[58] Field of Search .............................. 709/217; 348/10, 348/12, 13, 6, 7; 455/5.1, 4.2, 3.1, 6.1, 6.2, 6.3; 345/327

[56] References Cited

U.S. PATENT DOCUMENTS

| | | | |
|---|---|---|---|
| 4,484,217 | 11/1984 | Block et al. | 358/84 |
| 4,710,955 | 12/1987 | Kauffman | 455/2 |
| 4,961,109 | 10/1990 | Tanaka | 358/84 |
| 5,319,454 | 6/1994 | Schutte | 348/7 |
| 5,353,121 | 10/1994 | Young et al. | |
| 5,828,845 | 10/1998 | Jagadish et al. | 348/7 |

FOREIGN PATENT DOCUMENTS

| | | |
|---|---|---|
| 66789 | 1/1994 | Japan . |
| 7-288796 | 10/1995 | Japan . |

*Primary Examiner*—Nathan J. Flynn
*Assistant Examiner*—Vivek Srivastava
*Attorney, Agent, or Firm*—Michaelson & Wallace; Peter L. Michaelson

[57] ABSTRACT

A pay program broadcasting receiver apparatus that receives pay programs, in accordance with the present invention, has a device that stores a limit total viewing charge for a specified period of time, a device that stores a total viewing charge within a predetermined period of time, a display device, and a signal generation device that, in response to an instruction by a user, generates a signal for simultaneously displaying at least the limit total viewing charge for a specified period of time and the total viewing charge within a predetermined period of time, wherein an output from the signal generation device is displayed on the display device. As a result, data relating to charges for pay broadcast programs is appropriately provided to users.

5 Claims, 15 Drawing Sheets

Program Guide

| | 8:00pm | 8:30pm | 9:00pm | 9:30pm |
|---|---|---|---|---|
| CHANNEL 100 | *NR* News 1 | *NR* News 2 | *NR* News 3 | *NR* News 4 |
| CHANNEL 200 | *PG* Drama 1 | | | *Drama 2* |
| CHANNEL 300 | *G* Movie 1 | *NC17* Movie 2 | | *G* Movie 3 |
| CHANNEL 400 | *NR* Tennis | *NR* Baseball | | |
| CHANNEL 500 | ... | ... | ... | ... |

FIG. 2

Charge Management Schedule

| Name | Budget | Personal Code | Password |
|---|---|---|---|
| Terry | $ 40 | 01 | **** |
| Ann | $ 40 | 02 | **** |
| Bob | $ 20 | 03 | **** |
|  | $ |  |  |

User Setting Screen

| | |
|---|---|
| Personal Code | 01 |
| Name | Terry |
| Password | **** |
| Child Recognition Code | YES    NO |

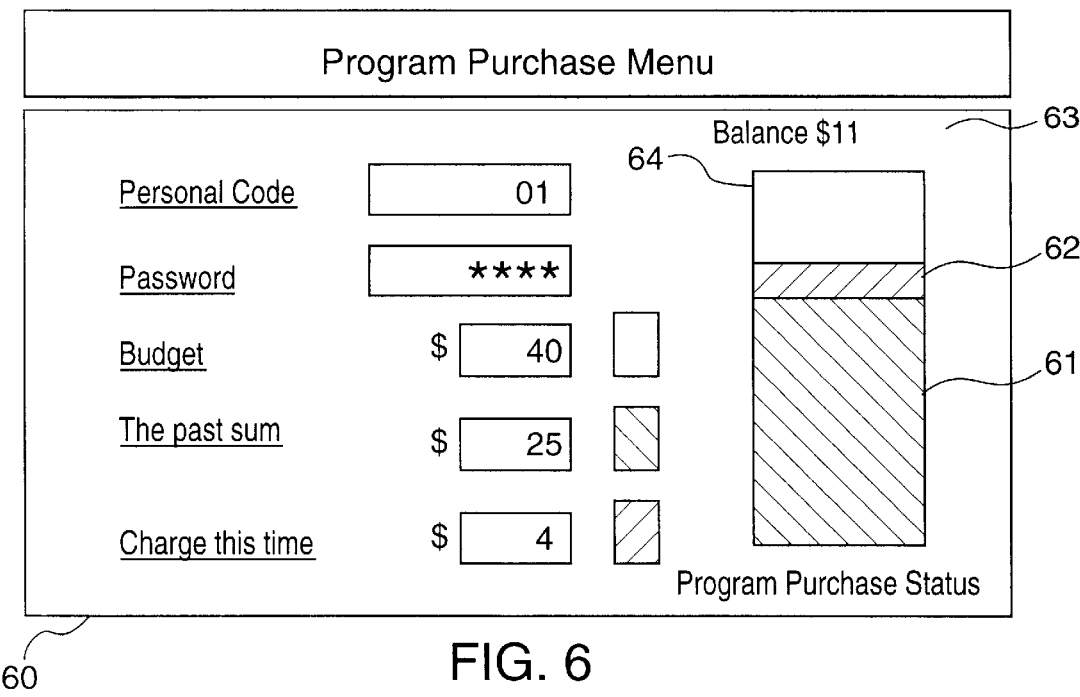
FIG. 6
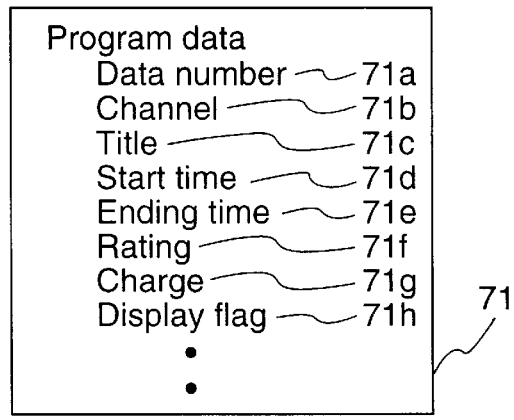
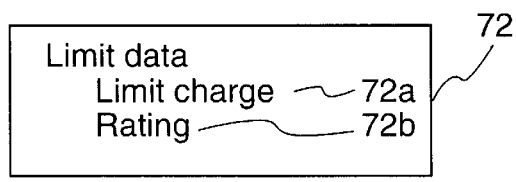
FIG. 7

FIG. 16

| Title | CH | Start Time | | Ending Time | Price |
|---|---|---|---|---|---|
| G | 1 | 5:30 | ~ | 6:00 | 1000 |
| A | 3 | 11:00 | ~ | 11:30 | 900 |
| B | 7 | 3:00 | ~ | 5:00 | 900 |
| C | 33 | 7:00 | ~ | 8:30 | 850 |
| D | 17 | 7:30 | ~ | 9:00 | 600 |
| E | 6 | 6:00 | ~ | 8:30 | 550 |
| F | 22 | 9:00 | ~ | 12:00 | 400 |

FIG. 17

| Title | CH | Start Time | | Ending Time | Price |
|---|---|---|---|---|---|
| A | 3 | 11:00 | ~ | 11:30 | |
| B | 7 | 3:00 | ~ | 5:00 | |
| C | 33 | 7:00 | ~ | 8:30 | 9000 |
| D | 17 | 7:30 | ~ | 9:00 | |
| E | 6 | 6:00 | ~ | 8:30 | |
| F | 22 | 9:00 | ~ | 12:00 | 700 |
| G | 1 | 5:30 | ~ | 6:00 | |

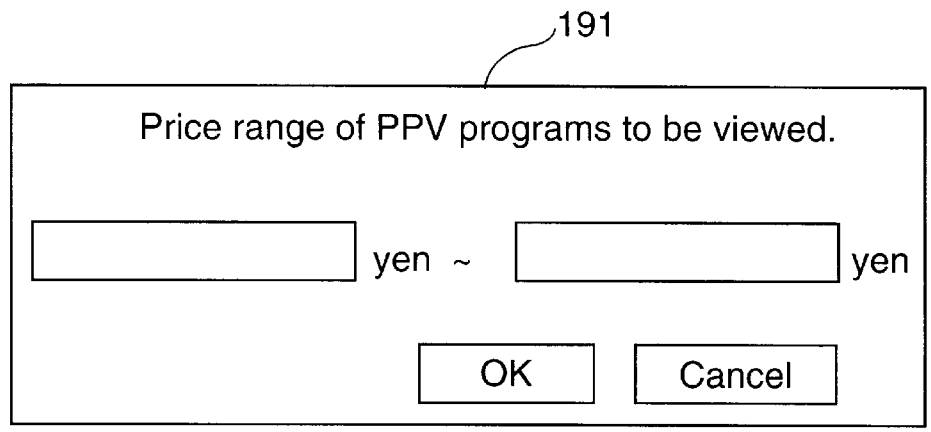
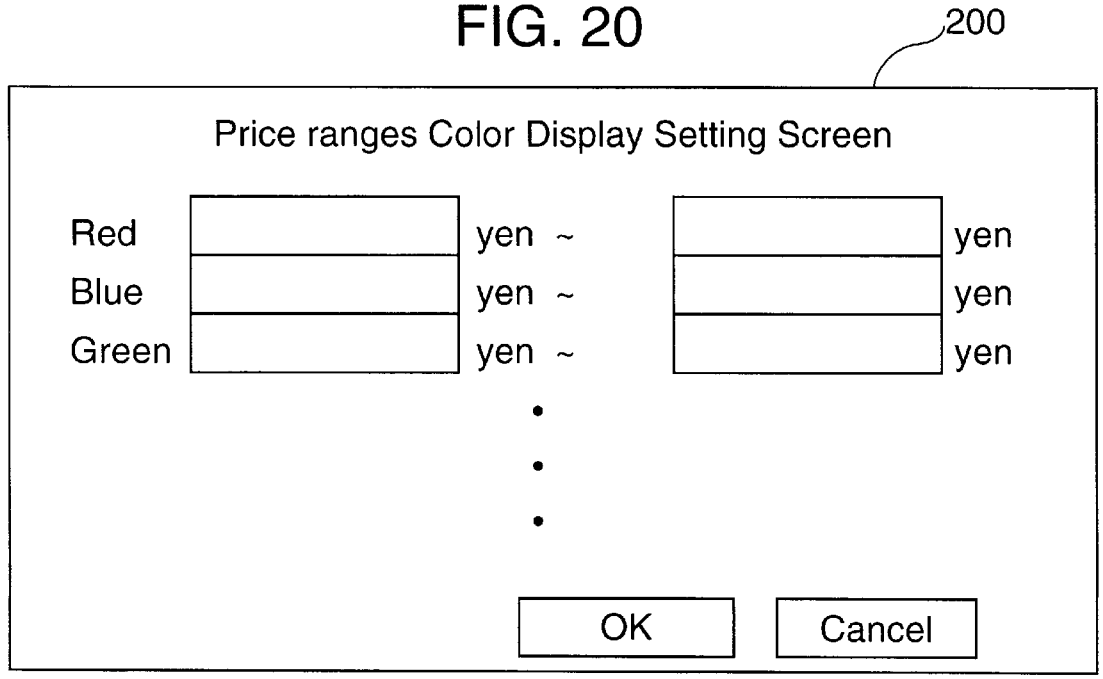

ID:6,067,564

PAY BROADCASTING RECEIVER APPARATUS

BACKGROUND OF THE INVENTION

The present invention relates to a pay broadcasting receiver apparatus that is utilized in pay broadcasting systems, for example, a pay-per-view broadcasting system in which a fee is charged for each program.

PRIOR ART

In some satellite broadcasting or CATV broadcasting system, a receiving contract is made for each program ordered and the user is charged for the program (for example, see Japanese laid-open patent application HEI 5-176320). With a receiver apparatus for a DSS system that is available in the United States, a user can purchase pay-per-view (PPV) programs, such as movies, while viewing an on-screen menu on the TV receiver. In the system, the user can set and register a charge limit for each program. Namely, the system has a viewing charge management function.

Although not directly related to the pay broadcasting system in TV broadcasting, Japanese laid-open patent application HEI 3-237864 describes a warning system implemented in a communication apparatus that is connected to a communication network. Through the communication network, communication charge data is sent to a terminal when a program transmission is completed. The warning system adds up communication charge data, stores the data and gives warning to the user if a separately set upper charge limit is reached.

SUMMARY OF THE INVENTION

It is an object of the present invention to provide a pay broadcasting receiver apparatus equipped with a program charge management function that is more user-friendly to pay broadcasting users.

It is another object of the present invention to provide a pay broadcasting receiver apparatus that enables a plurality of users to independently manage their program charges.

It is still another object of the present invention to provide data for program charges of pay broadcasting programs in a form easier to understand by the users.

It is a further object of the present invention to provide a pay broadcasting receiver apparatus that is capable of controlling display modes for guiding broadcasting programs according to broadcasting program charge data and rating data.

It is still a further object of the present invention to provide a pay broadcasting receiver apparatus that is capable of sorting broadcasting programs into categories based on broadcasting program charge data, and capable of controlling display modes for guiding broadcasting programs according to the categories.

A pay broadcasting receiver apparatus, in accordance with the present invention, has a device that stores a limit of the sum of broadcasting charges for a specified period of time, a device that stores the sum of broadcasting charges for a predetermined period of time, a display device, a signal generating device that generates a signal for simultaneously displaying the sum of broadcasting charges for a specified period of time and the limit of the sum of broadcasting charges for a predetermine period of time, wherein an output from the signal generating device is displayed on the display device.

Further, the pay broadcasting receiver apparatus, in accordance with one embodiment of the present invention, has a display signal generating device that generates a display signal for displaying data for a plurality of programs on the display device, wherein display modes of displaying data for the plurality of programs are controlled based on charge data for purchasing the programs and rating level data for the programs that are transmitted with the programs.

Still further, the pay broadcasting receiver apparatus, in one embodiment of the present invention, has a display signal generating device that generates a display signal for displaying data for a plurality of programs on the display device, and an input device that inputs limit conditions for the program charges, wherein display modes of displaying data for the plurality of programs are controlled based on the limit conditions and charge data for purchasing the programs that are transmitted with the programs.

Due to the above-described features of the present invention, more appropriate and useful broadcasting program charge information is provided to the users.

In one feature of the present invention, the device that stores a limit of the sum of broadcasting charges for a specified period of time and the device that stores the sum of broadcasting charges for a predetermined period of time is capable of storing a plurality of sets thereof for a corresponding plurality of users. Accordingly, even when a plurality of users use the same pay broadcasting receiver apparatus, appropriate information is provided to the individual users.

BRIEF DESCRIPTION OF THE DRAWINGS

FIG. 2 shows an example presentation of a program guide display screen.

FIG. 3 shows an embodiment presentation of a charge management display screen.

FIG. 4 shows an example presentation of a user setting display screen.

FIG. 6 shows an example presentation of a program purchase display screen.

FIG. 7 shows a data structure in accordance with a first embodiment of the present invention.

FIG. 16 shows an example presentation of a list display screen.

FIG. 17 shows another example presentation of a list display screen.

FIG. 19 shows an example presentation of a display price range designating screen.

FIG. 20 shows an example presentation of a price range color display setting screen.

DETAILED DESCRIPTION OF PREFERRED EMBODIMENTS

Figure 1:
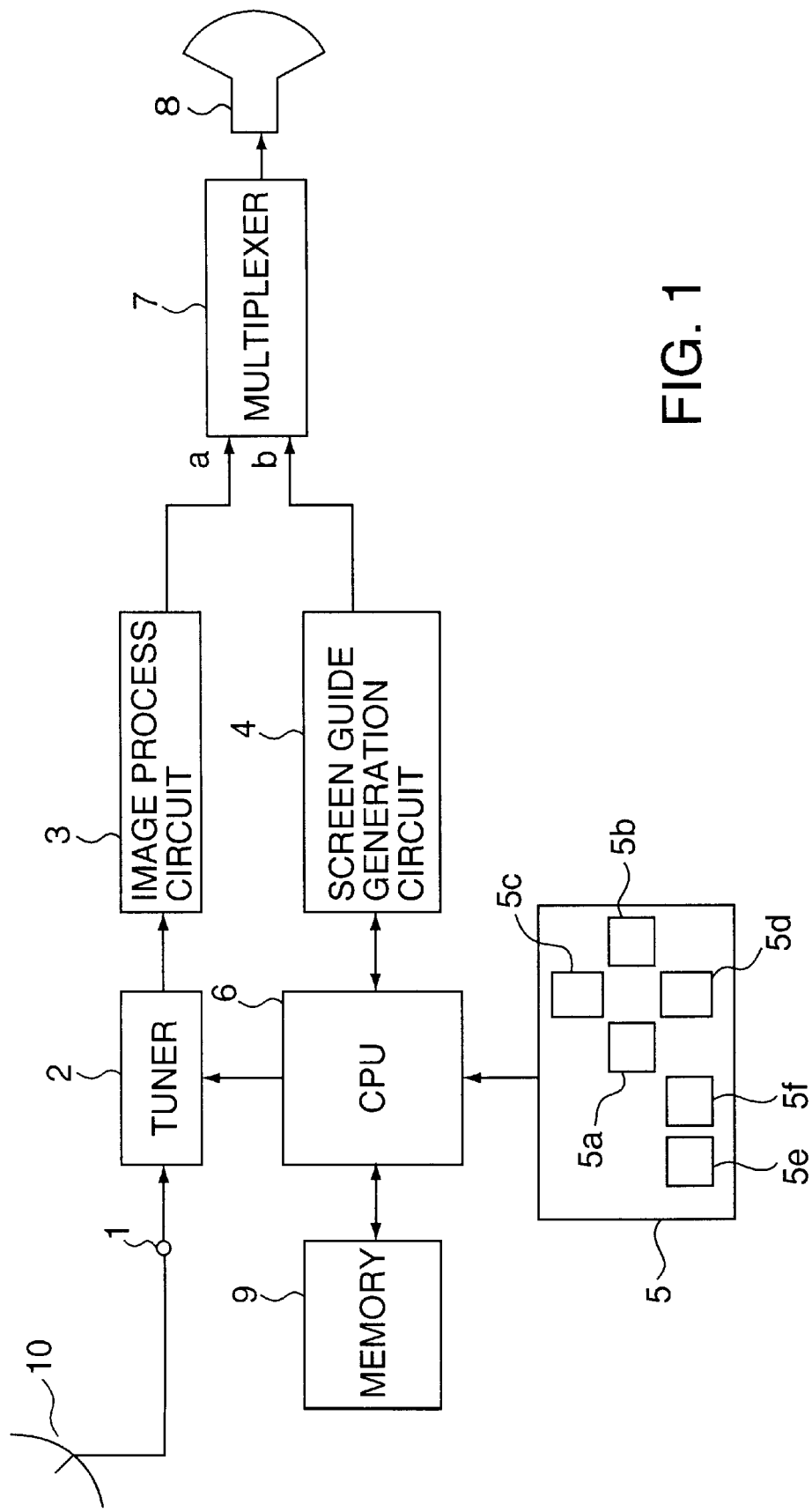
FIG. 1 shows a block diagram of a pay broadcasting receiver apparatus in accordance with the present invention.

A structure of a receiver apparatus will be briefly described with reference to FIG. 1. A high frequency signal from a parabolic antenna 10 is connected to an antenna terminal 1. A tuner 2 receives the high frequency signal performs processes including frequency conversion and quadrature phase shift keying (QPSK) demodulation, and outputs a data stream of digital image signals. An image process circuit 3 Motions Picture Expert Group decodes the output from the tuner 2, and coverts it into an analog image signal, for example an National Television System Committee (NTSC) signal, to be displayed on a TV receiver apparatus.

A CPU 6 is a microcomputer that controls the entire receiving apparatus. A memory 9 stores programs or data. In accordance with this embodiment, the memory 9 is an EPROM that is electrically rewritable. In alternative embodiments, a combination of a RAM that is always supplied with power and a ROM or another storage media (hard disk, floppy disk or the like) that stores programs may be used.

The image process circuit 3 also extracts data for programs, and supplies the data through an on-screen guide generation circuit 4 to the CPU 6. An input section 5 includes a keyboard or remote control operation buttons for inputting specified codes to the CPU 6 so that the receiver apparatus is controlled accordingly. The on-screen guide generation circuit 4 generates an on-screen display screen signal based on outputs from the tuner 2 and the CPU 6. The generated display screen signal is supplied through a multiplexer 7 to a display device 8 of the TV receiver apparatus. The signal generated by the on-screen guide generation circuit 4 is used for displaying a screen image on the display device 8. It is noted that methods of forming such a signal have been practiced to date, and therefore a description of such methods is omitted.

A user of the receiver apparatus inputs data through the input section 5 and interactively perform various operations, such as, for example, selection of programs, purchase of pay-per-view programs, setting of a viewing charge limit for a specified period of time, according to the on-screen guide displayed on the display device 8.

For example, a user operates cursor buttons 5a~5d of the input section to view information for programs that are currently broadcasted and programs that will be broadcasted on a program guide display screen 20 shown in FIG. 2. When the user presses a select button 5e, a program channel indicated by a cursor is selected. For pay-per-view programs that are not currently broadcasted, an advance purchase process operation can be performed. The program guide display screen 20 also shows program ratings and viewing charges, as described in detail below. Display modes for displaying programs on the program guide display screen 20 vary depending on different combinations of the viewing charges and the ratings.

FIG. 3 shows a charge management setting display screen 30. Each individual user can independently manage his own budget for pay-per-view programs. Namely, users' names, charge limits, users' identification numbers, passwords are displayed so that each individual can set a limit to the viewing charge for a specified period of time. In this embodiment, four users can set limits for viewing charges. For setting a charge limit of a user, a cursor is moved to a charge limit section for the user, a new charge limit is inputted, and then a password for the user must be inputted. This is required so that other users cannot change someone else's charge limit without authorization. It is noted that, although a detailed description will not be provided herein, the passwords are registered on a different display screen.

Also, in accordance with this embodiment, an arrangement is made so that a particular user cannot change his own charge limit without inputting another user's password. For example, this allows only parents in a family to set or change a charge limit for children in the family. By doing so, viewing of pay-per-view programs for children can be controlled by the parents.

Personal data used herein has a structure as follows. Each individual user is provided with personal data consisting of a personal identification number, a name (eight half-size (hankaku) characters or less), a viewing charge limit for a specified period of time, a password (four half-size characters), the sum of viewing charges within the specified period of time and a management level (child) identification code. Four sets of such personal data can be stored. The data is stored in the memory 9, and the data is read and written by the CPU 6. Numbers from 01 to 04 are assigned in advance to the respective identification numbers. The CPU 6 manages the users based upon the personal identification numbers. The names are inputted for simplicity of user operation. The passwords are inputted and set in a user setting display screen 40 as shown in FIG. 4. When the passwords are inputted, the passwords are not displayed on the screen.

The viewing charge limit is the sum of viewing charges that is to be limited for a specified period of time, for example, one month. This value is inputted on the display screen shown in FIG. 3 and stored in association with the individual user. As described above, the management level (child) identification code is data that is used by the parents to control their children's charges. When this data is set at zero (0), an individual user can modify or change his charge limit on the display screen shown in FIG. 3 by inputting his own password. However, when this data is set at one (1), an individual user for this code is considered to be a child (controlled user), and a password for a user code 01 (for a managing user) must be inputted to change the charge limit. In the user setting display screen 40 shown in FIG. 4, "Yes" or "No" is selected for inputting either of the codes ("Yes" indicates that a child is a user). The user setting display screen 40 is not displayed unless a password of a managing user with the user code 01 is inputted (except when the receiver apparatus is just purchased). In both of the cases, when necessary data is inputted at specified sections on the display screen, the select button 5e in the input section 5 is depressed to complete the data input operation.

The sum of viewing charges for a specified period of time is the sum of viewing charges for programs that a user has watched within the specified period of time, for example, within one month. The sum of charges is renewed according to operations on a program purchase display screen shown in FIG. 6 and a flow chart shown in FIG. 5.

Figure 5:
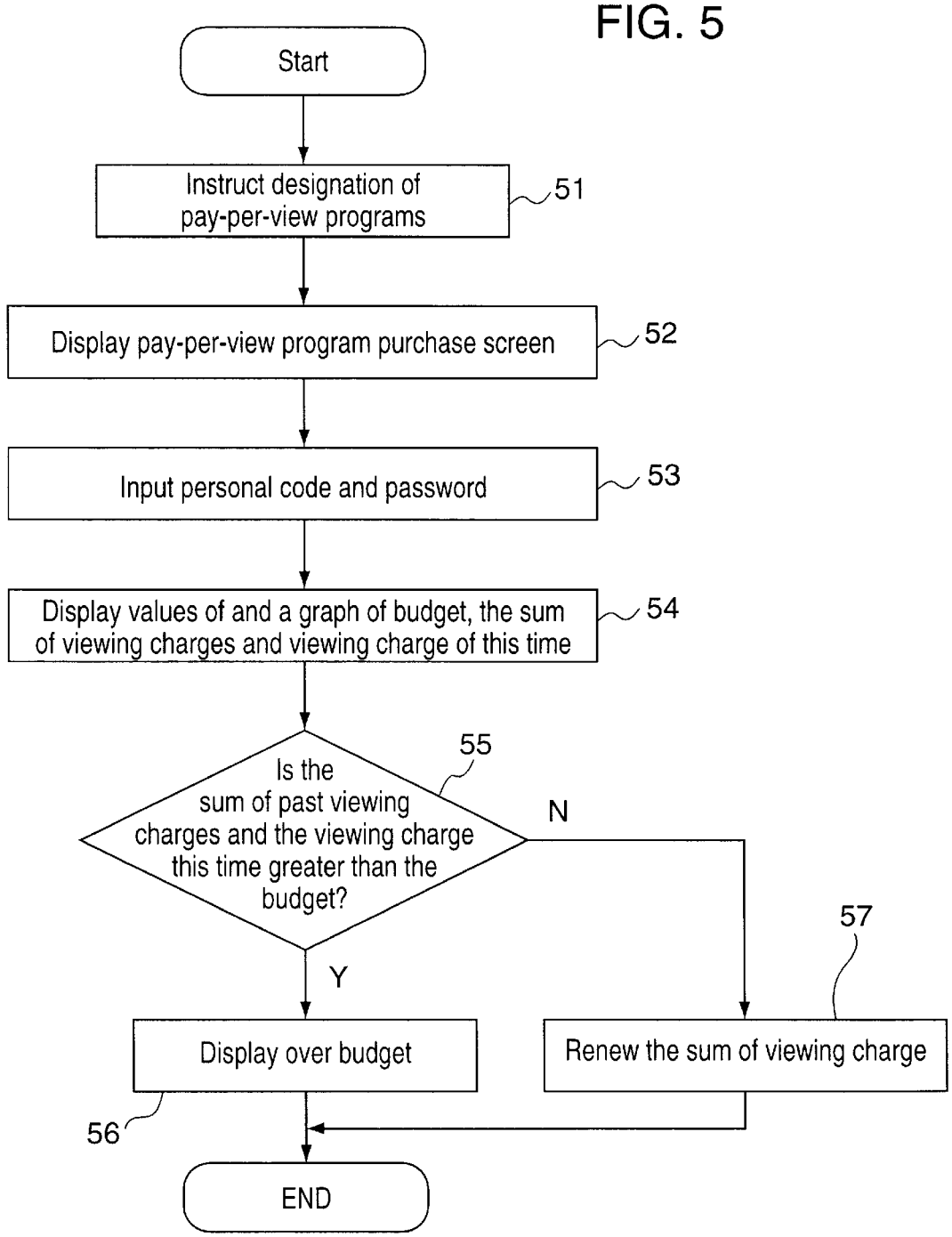
FIG. 5 shows a flow chart representative of a process of purchasing pay-per-view programs.

Next, in accordance with the present invention, operations of the receiver apparatus performed when programs are purchased will be described with reference to FIG. 5 and FIG. 6. When a user selects, on the program guide menu screen shown in FIG. 2, a pay-per-view program by means of the input section 5 (step 51), a program purchase screen 60 shown in FIG. 6 is displayed (step 52). On the program purchase screen 60, a personal identification number (personal code) and a password corresponding to the personal identification number are inputted (step 53). When the combination thereof matches the one stored, the purchase of the programs is permitted.

At this time, a viewing charge limit amount (a budget) for a specified period of time 64, a total of viewing charges for pay-per-view programs that have been watched to date (the sum of viewing charges within a specified period of time) 61, a charge for the program that is currently purchased (a new viewing charge) 62 are displayed in digits in specified areas on the screen, and a graph representative of the viewing charges is also displayed (step 54). A balance 63, as against the viewing charge limit amount for a specified period of time 64, is also displayed in digits. By the displayed graph, a user can visually confirm the sum of viewing charges within a specified period of time 61 as against the viewing charge limit amount 64, the balance amount and the like. The user can confirm his own purchase status indicative of how much he has already purchased and the balance as against the budget when he purchases new pay-per-view programs. The data is displayed not only when new programs are purchased, but also at any time when the user desires to see the data.

Then, a total of the sum of viewing charges to date and the viewing charge for the new program that the user is presently purchasing is calculated, and the total is compared with the viewing charge limit amount (step 55). When the total is less than or equal to the viewing charge limit amount, the sum of viewing charges is renewed with the total, the user is asked to reconfirm the purchase of the program, and the program is purchased if the user agrees (step 57).

When a total of the sum of viewing charges to date and the viewing charge for the new program that the user is presently purchasing is greater than the viewing charge limit amount, an indication of over-budget is displayed on the screen (step 56). At this moment, if necessary, the user may return to the budget management display screen, change the viewing charge limit amount and purchase the programs again. However, when the user is someone who is under control, he himself cannot change the limit amount. Therefore, the user cannot purchase the programs.

The sum of viewing charges within a specified period of time is cleared and reset to zero by a calendar means implemented in the receiver apparatus when the month changes. For example, the sum is cleared when the date becomes the first day of the month.

In an alternative embodiment, the sum of viewing charges within a specified period of time may be cleared according to a payment schedule time set by a payper-view broadcasting system.

Next, the display operation on the program guide screen will be described in detail.

First, a data structure that is used by the program executed by the CPU 6 will be briefly described with reference to FIG. 7. Program information transmitted from Limit data 72 shown in FIG. 7 is likewise stored in the memory 9, and contains a pair of charge limit data 72a representative of a limit of charge and rating data 72b for each program.

Figure 8:
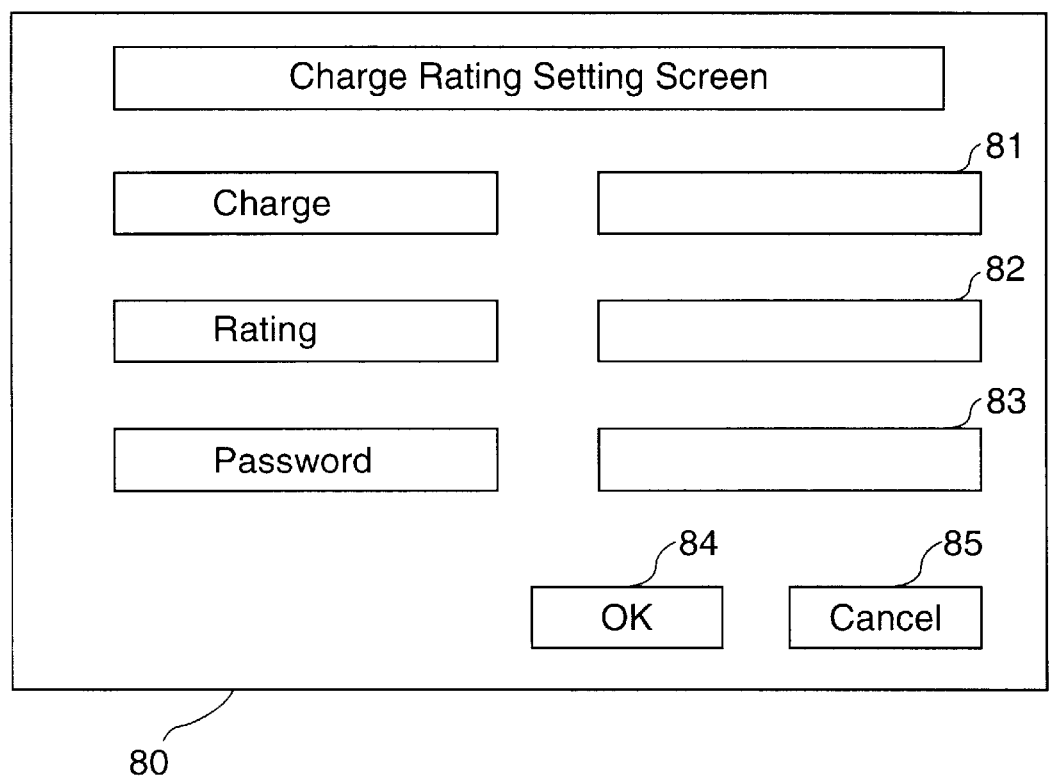
FIG. 8 shows an example presentation of a charge and rating setting display screen.

The limit data 72 is set on a charge-rating setting display screen 41 shown in FIG. 8. When a charge-rating setting request is inputted by an input device, such as, for example, a remote controller, the CPU instructs the on-screen guide generation circuit 4 to display a setting screen 80. The setting screen 80 shows a charge limit input box 81, a rating input box 82, a password input box 83, an OK button 84, a cancellation button 85. A cursor displayed on the setting screen 80 moves over these boxes and buttons according to a cursor movement operation performed by the input device. When the cursor is placed on the input boxes 81, 82 and 83, a charge, a rating and a password can be inputted by a keyboard of the input device 5, respectively. After a charge limit value and/or a rating are inputted with a password, the cursor is moved to the OK button and the select button of the input device 5 is depressed to set new limit data.

Here, the password must concur with a password registered on a different display screen. An input of a password is required in order to change or set a rating or a charge limit so that an unauthorized person is prevented from changing the set values.

Figure 9:
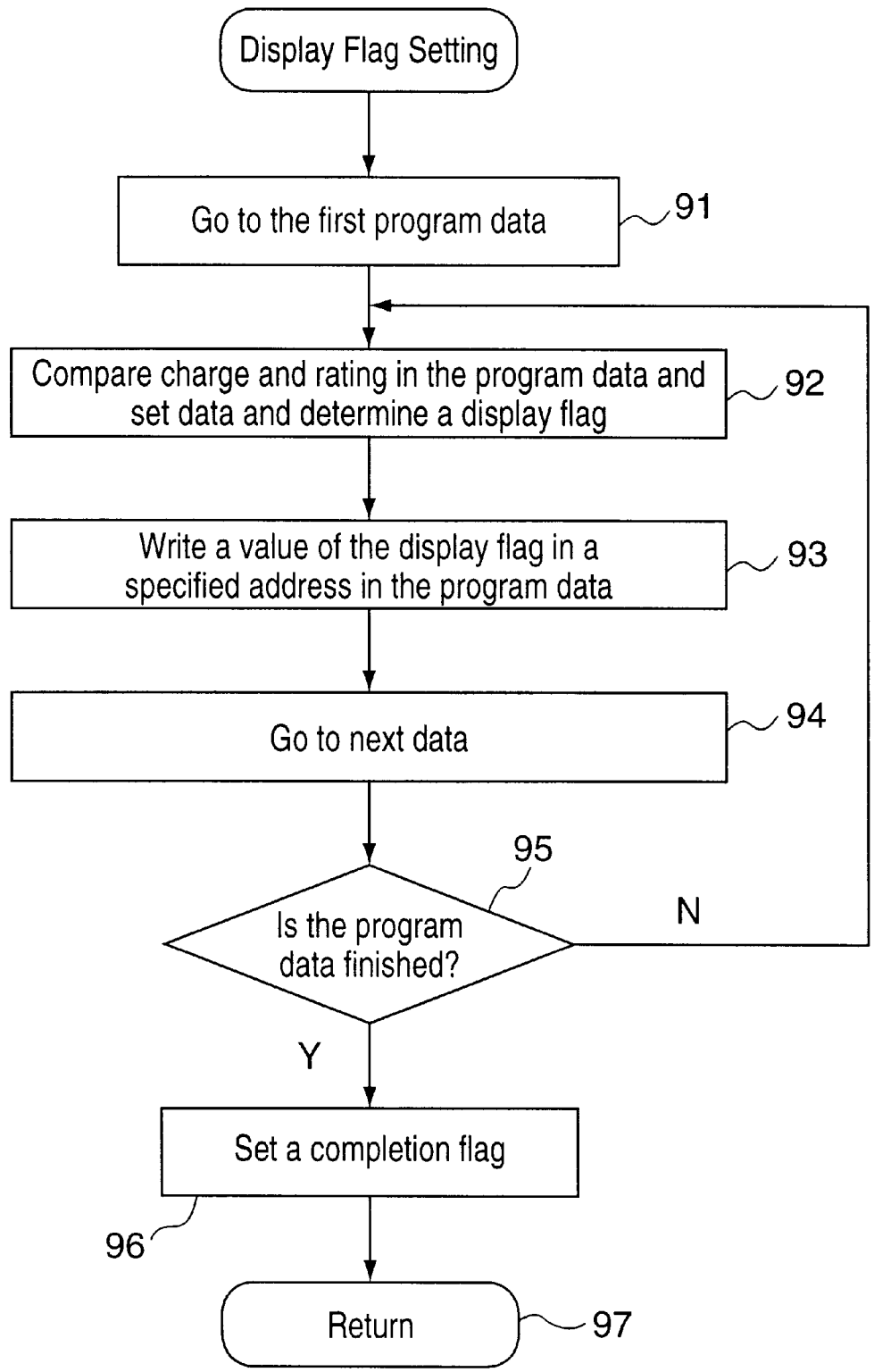
FIG. 9 shows a flow chart representative of a display flag setting process.

When the charge-rating setting is changed, the CPU 6 executes a setting process for setting display flags 71h shown in FIG. 9. First, an end flag E is reset and first program data in the program data is selected (step 91), charge data and rating data in the first program data are compared with the set limit data and a display flag value is determined accordingly (step 92). Then, the display flag value is the satellite is extracted by the image process circuit, and then stored in the memory 9 as program data, as shown in FIG. 7. The program data set 71 is provided for each program and contains identification number data 71a, channel data representative of a channel the program belongs 71b, program title data 71c representative of a title of the program, starting time data 71d, ending time data 71e, rating data 71f representative of a rating of the program, charge data 71g representative of a charge required for purchasing the program when the program is a pay-per-view program, and display flag data 71h representative of a display mode for the program. Therefore, when information for 500 different programs is transmitted from the satellite, 500 program data sets are stored in the memory 9.

For example, the rating data 71f includes data indicative of NR (no restriction), PG (children must be accompanied by guardians), PG-13 (children under 13 years old must be accompanied by guardians), R (children under 17 years old must be accompanied by adults), NC-17 (children under 17 years old are prohibited to view) or the like. The charge data 71g contains digits representative of respective charges of the programs when they are pay-per-view programs, and zero (0) for free programs.

The display flag data 71h is data that contains an instruction of how a program defined by its data number is displayed on the guide display screen. In accordance with an embodiment of the present invention, the display flag 71h contains one (1) for an ordinary display, two (2) for a display that is controlled by the rating, three (3) for a display that is controlled by the charge, and four (4) for a display that is controlled by both of the rating and the charge. written in the memory as a display flag 71h for the program data that is processed (step 93). Then, a second program data is selected as data to be processed (step 94). These steps are repeated until all the program data are exhausted (step 95). When display flags are set for all the program data, an end flag E is set (step 96), and another process is started. The display flag setting process is executed not only when the limit data is changed, but also when the program data is changed.

Figure 10:
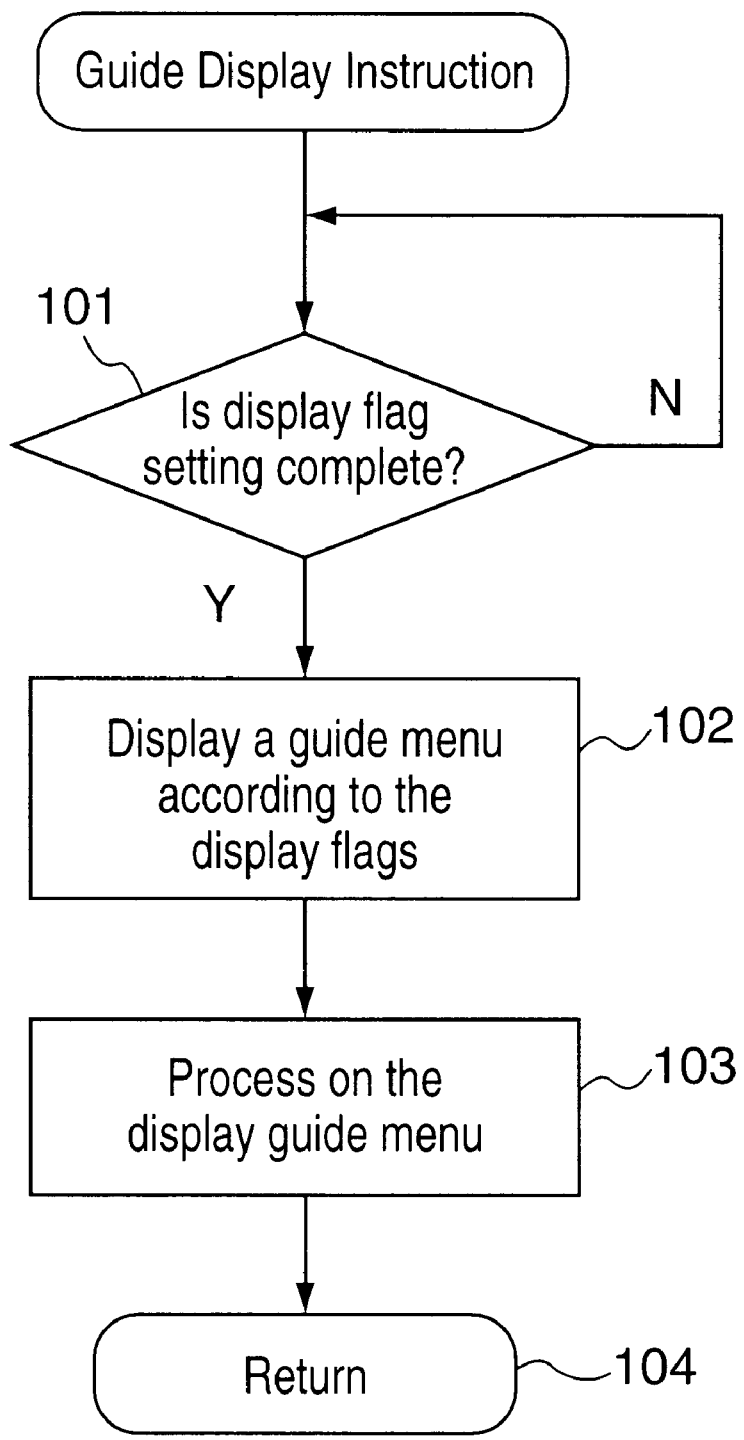
FIG. 10 shows a flow chart representative of a program guide display process.

When the display button 5f of the input device 5 is operated, a guide display process shown in FIG. 10 is executed. First, a determination is made in step 101 as to whether or not an end flag E is set in order to confirm if the process of setting the display flag 71h has been completed. When the process of setting the display flags 71h has not been completed, the process waits until the display flag setting process is completed. When the display flag setting process is completed, a program guide display 20, that is similar to the one shown in FIG. 2, is generated according to contents of the program data and displayed on the screen of the CRT 8 (step 102). Processes including cursor movements and selection of programs are executed on the program guide screen (step 102), and the process returns to the main routine.

The display operation in step 102 will be described in detail below. The display flags 71h have been set for the respective program data stored in the memory 9 as a result of comparison between the charge data 71g and the rating data 71f and the limit data 72a and 72b, respectively. As described above, when the rating 71f for a program is higher than a level of the limit data 72a, two (2) is set as a display flag. Here, the higher the level of the rating, the narrower the range of audiences permitted to view the program. Namely, the rating levels described above as an embodiment are higher in the following order, NC-17>R>PG-13>PG>G>NR. When the charge for a program 71g is higher than a limit charge of the limit data 72a, three (3) is set as a display flag. When both of the rating and the charge are applicable, four (4) is set as a display flag. When neither the charge or the rating is applicable, one (1) is set as a display flag.

In step 102, an instruction is given to the on-screen guide generation circuit 4 to generate a guide screen containing grid frames based on the channel data 71b, the start time data 71d and the ending time data 71e of the program data 71. More particularly, the grid frames are formed based on the starting time and ending time of programs within a viewable range (for example, from 8 p.m. to 10 p.m. along the time axis, and from a channel 100 to a channel 500 along the channel axis shown in the figure). Titles, ratings and charges of the programs are displayed within the respective corresponding grid frames.

Furthermore, based on the display flag values of the respective programs, the display mode of each of the titles is modified. In accordance with the present embodiment, the charge limit is set at five dollars and the rating is set at PG-13. Accordingly, a program entitled "Drama 1" 25 is restricted by the charge. Also, a program entitled "Movie 2" 26 has a rating of NC-17, which is more violent than PG-13. As a result, they cannot be viewed. Namely, the program entitled "Drama 1" 25 has a display flag of three (3), and the program entitled "Movie 2" 26 has a display flag of two (2). In this embodiment, the title for "Movie 2" 26 is displayed on the program guide screen in lighter colored characters. Also, the title for "Drama 1" 25 is displayed in lighter colored characters, and the frame cell for the title is displayed in a color (for example, blue) that is different from a color (for example, yellow) of the other frame cells.

Although not shown in the figure, when a program is restricted by both of the charge and the rating (when its display flag is four (4)), the title of the program is displayed in lighter colored characters, and the frame cell for the title is displayed in a color (for example, green) that is different from a color of frame cells for programs having the display flag of three (3). Accordingly, on the program display screen, the frame cells representative of the respective programs are displayed in four different manners according to their charges and ratings. Therefore, a user, by simply viewing the guide display screen, can recognize at a glance which programs can be viewed and which programs cannot be viewed at the current settings and understand why they are so presented.

In the above-described embodiment, the display mode of the program guide screen is changed according to different combinations of the program charge and the rating. However, in an alternative embodiment, program titles may be displayed according to price ranges of program charges. Next, a program guide display section in accordance with a second embodiment of the present invention will be described below.

Figure 11:
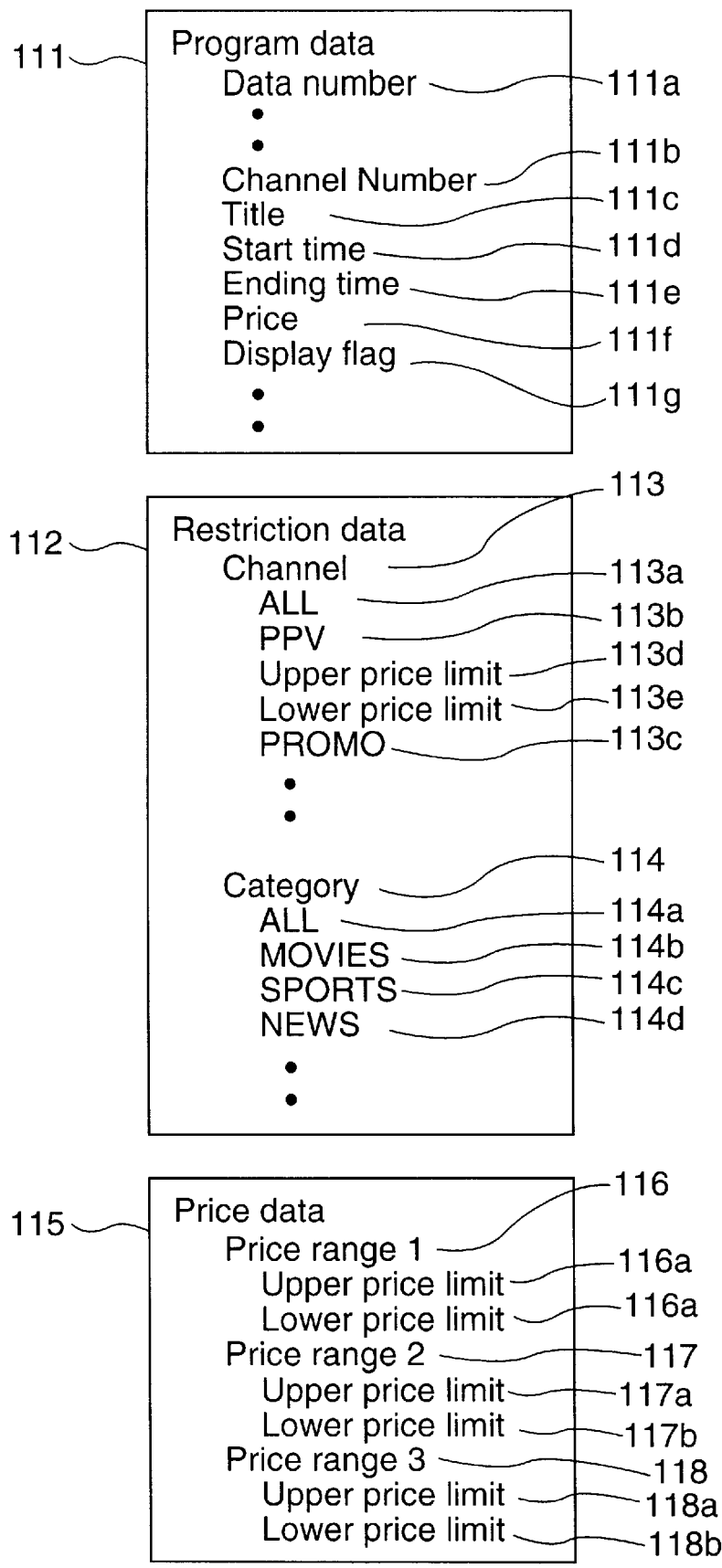
FIG. 11 shows a data structure in accordance with a second embodiment of the present invention.

Referring to FIG. 11, the second embodiment will be described. Program data set 111 includes program information transmitted from the satellite and is provided for each program. The program data set 111 for each program contains data for a data number 111a, a channel number 111b, a title 111c, a starting time 111d, an ending time 111e, a price 111f, a display flag 111g and the like. In other words, when information for 500 different programs is transmitted, 500 program data sets are formed and stored in the memory 9.

Limit data set 112 is data that designates a condition to control the program display mode, and is composed of channel related data 113 and category related data 114. The channel related data 113 contains flag item data that designate, for example, ALL (no restriction) 113a, PPV (a pay-per-view channel in which each program can be received when a purchase contract is made and a payment is made for the program) 113b, PROMO (a channel for promotional programs) 113c and the like. These flags are set exclusively to one another. However, when the PPV flag is set, an upper limit charge 113d and a lower limit charge 113e can also be set. The category related data 114 contains flags representative of ALL (no restriction) 114a, Movies (a movie program) 114b, Sports (a sports program) 114c, News (a news program) 114d and the like. Unlike the channel related data, a plurality of flags can be set in the category related data.

Price range data set 115 is data used for displaying different price ranges in different colors. In the illustrated embodiment, an upper price limit and a lower price limit can be set for each of three price ranges (price range 1, price range 2 and price range 3) 116,117 and 118. It is noted that limits in the price range data and the PPV data can be set exclusively to one another, as described in detail below.

Figure 12:
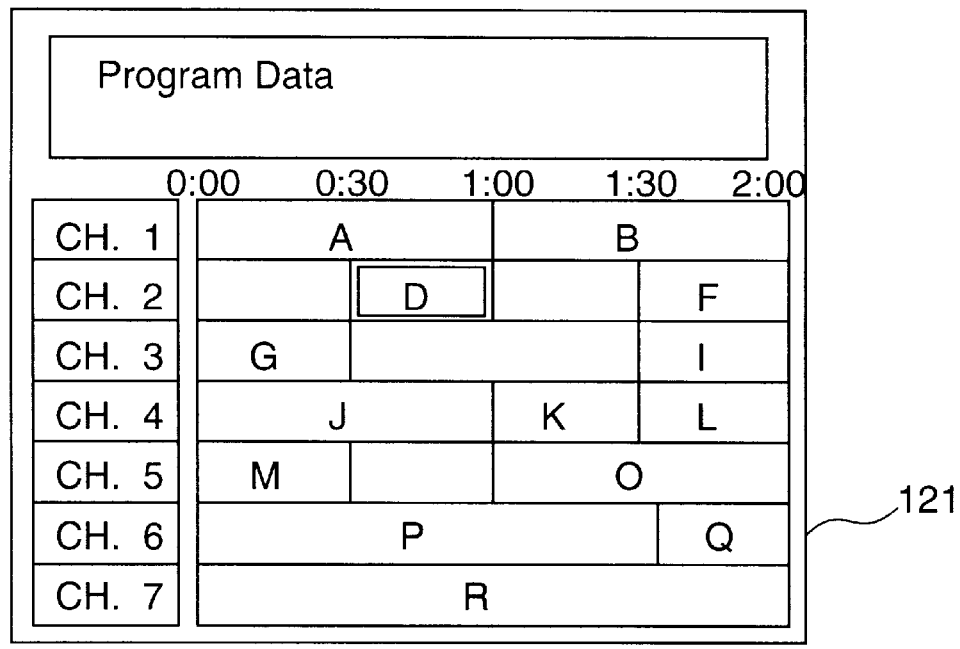
FIG. 12 shows an example presentation of a program guide display screen in accordance with the second embodiment.
Figure 13:
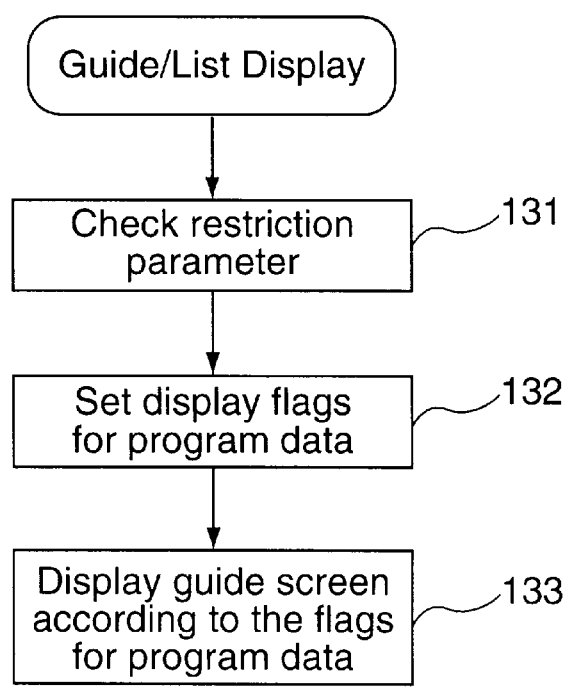
FIG. 13 shows a flow chart representative of a guide display process.

The program guide is displayed in a manner shown in FIG. 12. When a program guide screen 121 is generated, the on-screen guide generation circuit 4 refers to the currently set display parameters that are given by the CPU 6, and generates a guide display image based on the program data transmitted from the satellite, so that only program information that meets the designated conditions is displayed. When a user requests to display the program guide screen 121 or a program list by operating the input device 5, limit data and price range data are first checked (step 131). Based on the limit data and the price range data, display flags of the program data stored in the memory 9 are set (value one (1) is set) or reset (value zero (0) is set) (step 132). When the price range data is set, a value for identifying one of the price ranges to which a program belongs is stored. For example, four (4) is stored when the program belongs to the price range one, three (3) is stored when it belongs to the price range two, and two (2) is stored when it belongs to the price range three. When the program does not belong to any one of the price ranges, five (5) is stored. Based on the channel number data, start time data and ending time data, a display screen image that shows data in grid frames is generated. When the prices for pay-per-view (PPV) programs are restricted, program titles are displayed for only those programs in which the corresponding display flags are set. When a price range color display mode is designated, different display colors are selected based on corresponding values of the display flags, and a display screen is generated accordingly. In an embodiment, when the value is four (4), red is selected, when the value is three (3), blue is selected, and when the value is two (2), green is selected. when the value is five (5), an obtrusive color, such as, for example, gray is selected.

Figure 14:
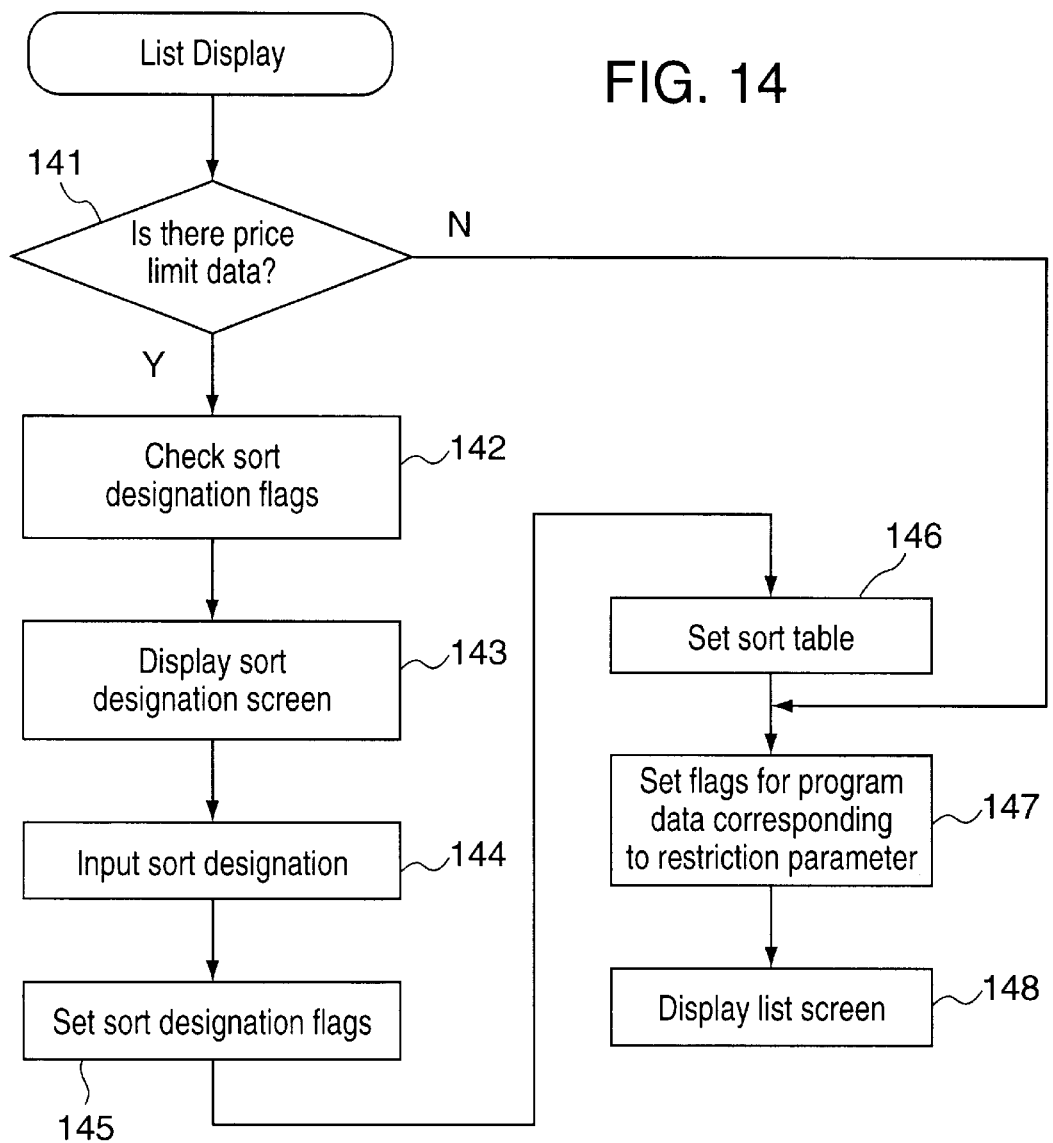
FIG. 14 shows a flow chart representative of a list display process.
Figure 15:
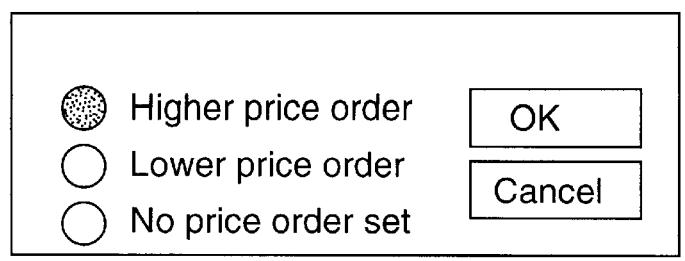
FIG. 15 shows an example presentation of a sort order designating screen.

When a user gives an instruction to display the program list by operating the input device 5, a process shown in FIG. 14 is executed. First, a determination is made as to whether the price limit data or the price range data is set (step 141). When they are not set, the process proceeds to step 147 and a program list is displayed. When they are set, sort designation flags stored in the memory 9 are read out (step 142), and a sort designation screen shown in FIG. 15 is displayed in accordance with the condition of the sort designation flags (step 143). There are three different sort designation flags representative of conditions of "In the order of higher prices", "In the order of lower prices" and "No price order is set", respectively, which are set exclusively to one another. The cursor is moved over to desired one of the sort orders, "In the order of higher prices", "In the order of lower prices" or "No price order is set", and the desired sort order is selected. When an "OK" button is selected, the sort designation flags are set according to the selected sort order (step 145). The program data shown in FIG. 11 are checked based on the designated sorting items to generate a sort table (steps 146).

The sort table is referred to in displaying the program list. The sort table contains arrangement data representative of data numbers that are arranged in the order in which they are displayed. The sort table is stored in the memory 9. When "No price order is set" is selected, the data numbers of the corresponding programs are stored in the sort table in the alphabetical order of the program titles in the same manner as the ordinary display of the program list. When "In the order of higher prices" or "In the order of lower prices" is selected, the data numbers of the corresponding programs are stored in the sort table in the order of the selected price order. In this case, when different programs are at the same price, data numbers of the programs are stored in the sort table in the alphabetical order of the titles.

In step 147, display flags 111g for the received program data are set according to the control parameters. In other words, the display flags 111g are set for the program data that are designated to be displayed based on the restriction parameters. In the opposite case, the flags 111g are reset. When the price range data 115 is set, values that identify the price ranges 116, 117 and 118 of the respective programs are written in the corresponding display flags. In displaying the program list, a display screen shown in FIG. 16 is generated and displayed based on the program data having the display flags 111g being set and according to the data of the sort table. Alternatively, the program list is displayed with different display colors that are selected based on the values of the display flags in a similar manner as the program guide screen (step 148).

FIG. 17 shows a program list display in which no restrictions are set with respect to the price range of pay-per-view (PPV) programs. In contrast, FIG. 16 shows a program list display generated under certain conditions in which a price range, for example, between 400 yen and 1000 yen is set for the PPV programs, and further, the program titles are shown in the order of higher prices. As described above, when different programs are at the same price, they are displayed in the alphabetical order of the titles.

Figure 18:
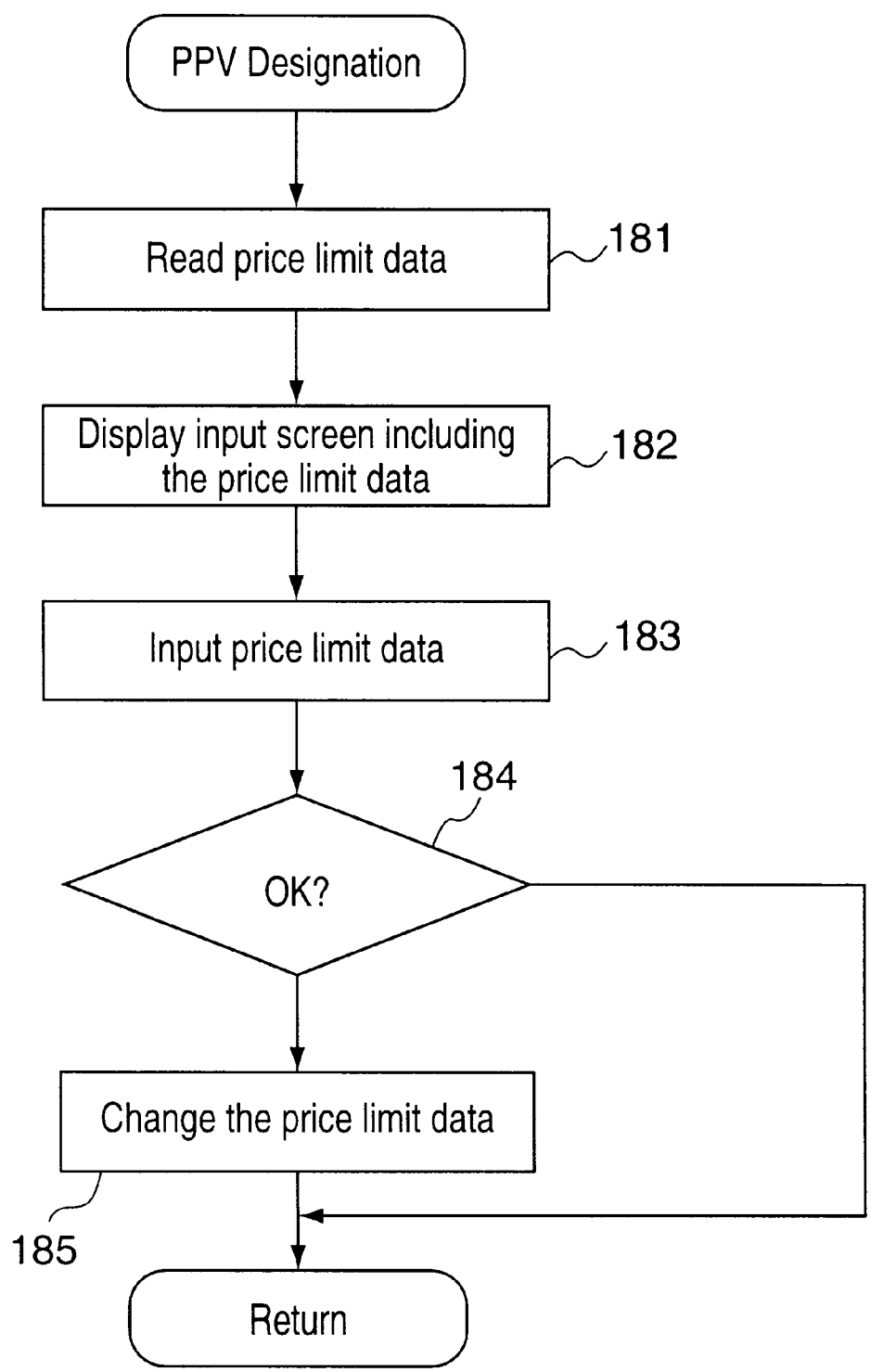
FIG. 18 shows a flow chart representative of a PPV designating process.

Next, data setting of the restriction data and the price range will be described. When restrictions are set to selectively display PPV programs, a process shown in FIG. 18 is executed. First, price restriction data 113d and 113e stored in the memory 9 are read (step 181), and an input display screen shown in FIG. 19 is displayed together with the read price restriction data (step 182). The price restriction data is composed of an upper price limit and a lower price limit. When both of the limits are set at zero (0), it is considered that there is no restriction. When there is no restriction, prices are not displayed on the input display screen 191.

When a user inputs price limit values on the input display screen by using a ten-key or the like (step 185), moves the cursor to an "OK" button and depresses the selection button 5d, the inputted price limit values are stored as the price restriction data 113d and 113e (step 185). In this case, all the price range data 115 is reset. When a "cancel" button is selected, the price restriction data is not changed and the process ends without changing the price restriction data. (When the "cancel" is selected, the same operation takes place as it is selected in the other setting display screens. Therefore, a detailed description of the operation is omitted.)

With respect to the channel related restrictions, when a restriction item other than PPV, such as, for example, PROM or the like is designated, a flag (ALL, PROMO or the like) corresponding to the selected restriction item is set, the other flags are reset, and the upper price limit data and the lower price limit data are set at zero (0). As described above, the selection can be made exclusively.

On the input screen 191, an upper price limit and a lower price limit for pay-per-view programs are inputted so that pay-per-view programs that can be displayed are limited. When no number is inputted in either of the upper price limit input section or the lower price limit input section, no limit is set with respect to pay-per-view programs. Only one of the upper price limit and the lower price limit may be inputted. In such a case, only one of the upper price limit and the lower price limit is set. Accordingly, when no number is inputted, the corresponding data is not changed.

Figure 21:
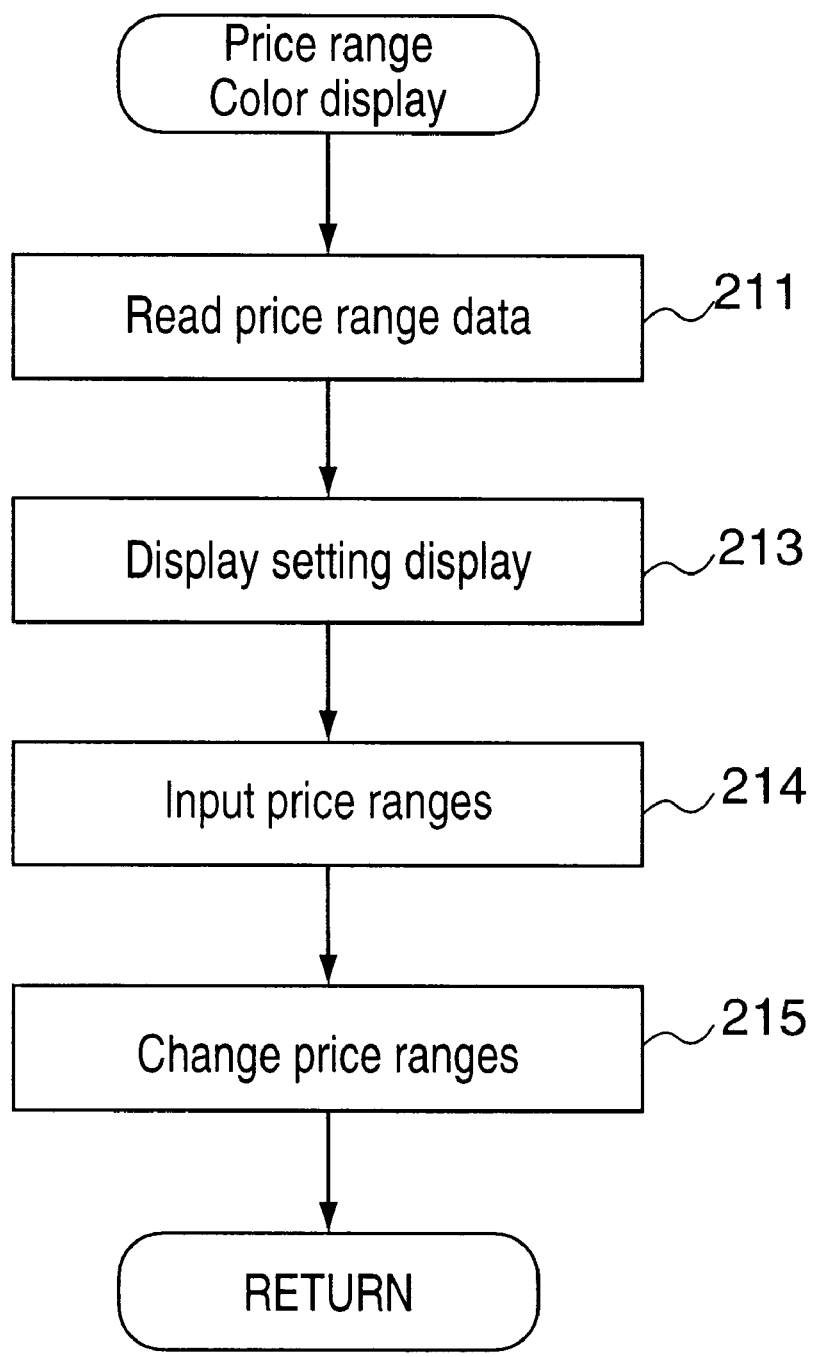
FIG. 21 shows a flow chart representative of a price range color designating process.

When a user operates the input device 5 to display different price ranges in different colors, first, price range data is read out (step 211 in FIG. 21). Then, a display setting screen 200 shown in FIG. 20 is displayed together with the price range data (step 213). When no number is set in the price range data, a blank space is displayed, in a similar manner shown in FIG. 19. An upper price limit and a lower price limit for each of three different price ranges may be set by using a ten-key or the like. When an "OK" button is selected (step 214), the inputted price limits are set as price range data (step 215). In the present embodiment, red is assigned to a price range one, blue is assigned to a price range two, and green is assigned to a price range three. The number of the price ranges may be increased. When a designation is made to display different price ranges in different colors, the display restriction based on the upper price limit and the lower price limit would lose its significance. Accordingly, the items relating to the limit data, namely, the PPV flags, the upper price limit and the lower price limit, are reset.

In the present embodiment, for simplicity of the program, no function to support a user in setting the price ranges one through three is provided. When the set price ranges overlap with one another, a higher one of the price ranges is selected on a priority basis. Namely, the priority lowers in the following order, red (the price range one)→>blue (the price range two)→>green (the price range three). In order to achieve this priority order, when values are set at the display flags, prices of the programs are successively verified in the order of "the price range one→>the price range two→>the price range three". When a price of a program is found to be in one of the price ranges, the verification for the following price ranges is not performed and a value for that price range is immediately set.

In the above-described embodiment, a plurality of price ranges are differentiated by different colors. However, other discernible display modes, for example, different hatching patterns and the like may be used.

What is claimed is:

1. A pay broadcasting receiver apparatus, comprising:
    a memory device that stores plural sets of data as users personal information, each set of the plural sets of data including user identification data, a password, a limit total viewing charge allotted the user for a specified period of time and a total viewing charge incurred by a user within a predetermined period of time;
    a device that designates programs selected to be viewed by the user;
    a device that calculates the sum of viewing charges of the programs selected to be viewed and the total viewing charge within a predetermined period of time when the programs are selected to be viewed;
    a charge comparing device that compares the sum with the limit total viewing charge for a specified period of time;
    an input device for inputting user input from the user; and
    a screen signal generation device that enables a man-machine interactive input in response to the user input;
    wherein, based on a result of comparison provided by the charge comparing device, when the sum is equal to or less than the limit total viewing charge for a specified period of time, the viewing charge within a predetermined period of time is combined with the sum to produce a new sum, and when the new sum is greater than the limit total viewing charge for a specified period of time, the screen signal generation device generates a signal representative thereof.

2. A pay broadcasting receiver as defined in claim 1, wherein the screen signal generation device generates a signal for displaying program purchasing conditions when the new programs are purchased.

3. A pay broadcasting receiver as defined in claim 1, further comprising a changing device that permits changes in the limit total viewing charge for a specified period of time only when an inputted password concurs with a stored corresponding password.

4. A pay broadcasting receiver as defined in claim 3, wherein the memory device further stores personal identification data indicative of the specific user, and further comprising a device that prohibits the specific user from changing the limit total viewing charge for a specified period of time.

5. The apparatus set forth in claim 1, wherein the specified period of time substantially equals, and runs substantially concurrently with, the predetermined period of time.

* * * * *